(12) United States Patent
Tae et al.

(10) Patent No.: US 7,448,898 B2
(45) Date of Patent: Nov. 11, 2008

(54) INFORMATION PROCESSING APPARATUS HAVING A MOUNTING SLOT AND MOUNTING SLOT DOOR THEREOF

(75) Inventors: Gi-hyun Tae, Yongin-si (KR); Ki-hyub Sung, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 11/565,063

(22) Filed: Nov. 30, 2006

(65) Prior Publication Data

US 2007/0128918 A1 Jun. 7, 2007

(30) Foreign Application Priority Data

Dec. 1, 2005 (KR) .................. 10-2005-0116558

(51) Int. Cl.
*H01R 13/62* (2006.01)
(52) U.S. Cl. ..................................... 439/367
(58) Field of Classification Search ............... 439/133, 439/134, 367; 361/759; 385/55, 31, 73
See application file for complete search history.

(56) References Cited

U.S. PATENT DOCUMENTS

| | | | | |
|---|---|---|---|---|
| 2,750,219 A | * | 6/1956 | Bleam | 292/198 |
| 4,319,794 A | * | 3/1982 | Bachor | 312/329 |
| 4,560,216 A | * | 12/1985 | Egawa | 439/41 |
| 5,222,792 A | * | 6/1993 | Kai et al. | 312/406 |
| 5,701,216 A | * | 12/1997 | Yamamoto et al. | 360/99.02 |
| 5,815,479 A | * | 9/1998 | Lee | 720/647 |
| 5,828,918 A | * | 10/1998 | Abe et al. | 396/439 |
| 5,967,633 A | * | 10/1999 | Jung | 312/223.2 |
| 6,052,254 A | * | 4/2000 | Kono et al. | 360/96.61 |
| 6,332,781 B1 | * | 12/2001 | Ito | 439/34 |
| 6,421,247 B1 | | 7/2002 | Fuchimukai | |
| 2004/0239828 A1 | | 12/2004 | Cho | |

FOREIGN PATENT DOCUMENTS

| | | |
|---|---|---|
| KR | 1999-30753 | 7/1999 |
| KR | 20-232049 | 5/2001 |
| KR | 10-304190 | 7/2001 |
| KR | 20-305308 | 2/2003 |
| KR | 2004-6992 | 1/2004 |
| KR | 2004-9621 | 1/2004 |
| KR | 2004-96097 | 11/2004 |

* cited by examiner

*Primary Examiner*—Chandrika Prasad
(74) *Attorney, Agent, or Firm*—Stanzione & Kim, LLP

(57) ABSTRACT

An information processing apparatus, the apparatus including a main body casing which has a mounting slot to which a peripheral device is insertably mounted, a door which is rotatably coupled with the main body casing to open and close the mounting slot, and an elastic member which is coupled with the main body casing to elastically press the door when the door rotates.

23 Claims, 6 Drawing Sheets

INFORMATION PROCESSING APPARATUS HAVING A MOUNTING SLOT AND MOUNTING SLOT DOOR THEREOF

CROSS-REFERENCE TO RELATED APPLICATIONS

This application claims priority under 35 U.S.C. §119(a) from Korean Patent Application No. 2005-0116558, filed on Dec. 1, 2005, in the Korean Intellectual Property Office, the disclosure of which is incorporated herein in its entirety by reference.

BACKGROUND OF THE INVENTION

1. Field of the Invention

The present general inventive concept relates to an information processing apparatus, and more particularly, to an information processing apparatus having an improved door configuration to open and close a mounting slot to which a peripheral device such as a secure digital (SD) card is detachably attached.

2. Description of the Related Art

Generally, an information processing apparatus processes various information to provide convenience to a user. For example, the information processing apparatus may comprise an MP3 player, a personal digital assistant (PDA), a cell phone, a digital camera, a digital photo frame, and a portable multimedia player (PMP). The information processing apparatus may further comprise a portable computer. Typically, the information processing apparatus is small-sized to be portable.

The information processing apparatus comprises a front cover and a rear cover which are coupled with each other. A circuit, such as a printed circuit board (PCB), is provided in the front cover. The rear cover is coupled with the front cover and protects the circuit. The information processing apparatus comprises a mounting slot to which a peripheral device, such as a secure digital (SD) card, a compact flash (CF) card, a multi media card (MMC), and a universal serial bus (USB), is detachably attached. A door is provided on the mounting slot to prevent dirt from being introduced. The door is open when the peripheral device, such as an SD card, is inserted to the mounting slot.

U.S. Pat. No. 6,421,247, filed on Jul. 16, 2002, describes a door slot locking mechanism of a digital camera as a kind of information processing apparatus. The conventional door slot locking mechanism comprises a camera body, a card slot which is formed on the camera body, and a card slot door which opens and closes the card slot to prevent dirt from being introduced to the card slot. The conventional door slot locking mechanism further comprises a rod and a torsion coil spring which couple opposite ends of the card slot door with the camera body, and a pair of door elastic members which are provided on a center of the card slot door and comprise a torsion coil spring. A projection is formed on the camera body to limit the door elastic member from rotating.

With such a configuration, the door elastic member is limited from rotating by the projection of the camera body. When a memory card is inserted into the card slot, the memory card presses the door elastic member to separate it from the projection of the camera body. Thus, the card slot door rotates and the memory card is inserted into the card slot. When withdrawing the memory card from the card slot, the card slot door rotates in a closing position by the torsion coil spring coupled with the rod.

However, in the conventional door slot locking mechanism, the card slot door configuration to open and close the card slot is complex. Also, the conventional information processing apparatus is not easily assembled, leading to a rise of production costs.

SUMMARY OF THE INVENTION

The present general inventive concept provides an information processing apparatus which has an improved door configuration for a mounting slot, to be easily assembled and to stably open and close the door.

Additional aspects and/or advantages of the present general inventive concept will be set forth in part in the description which follows and, in part, will be obvious from the description, or may be learned by practice of the present general inventive concept.

The foregoing and/or other aspects and utilities of the present general inventive concept are achieved by providing an information processing apparatus, comprising a main body casing which has a mounting slot to insertably mount a peripheral device, a door which is rotatably coupled with the main body casing to open and close the mounting slot, and an elastic member which is coupled with the main body casing to elastically press the door when the door rotates.

The main body casing may comprise a plurality of door slots which are formed adjacent to the mounting slot to rotatably guide the door between a closing position and an opening position, and an elastic member supporter which is formed on a plate surface of the main body casing and couples with the elastic member to support the elastic member to remain coupled to the main body.

The elastic member may comprise a mounting part which is formed on a first side thereof and couples with the elastic member supporter, and a keeping part which has at least one elastic projection provided on a second side thereof and is inserted into the door slots to press the door when rotating.

The elastic member supporter may comprise a position determining pin which is formed on a plate surface thereof, and the mounting part comprises a position determining pin hole which couples with the position determining pin.

The apparatus may further comprise a hinge part having a hinge shaft which is provided on one of the door and the main body casing, and a hinge shaft accommodating groove which is formed on the other one of the door and the main body casing and coupled with the hinge shaft.

The elastic member may press on a portion of the hinge shaft as the door rotates.

The main body casing may comprise a door grip to press and open the door in the closing position.

The elastic member supporter may comprise sliding grooves which face each other, and may slidably guide an end part of the mounting part.

The elastic projection may be formed on the keeping part to press the door in the opening position of the door.

The foregoing and/or other aspects and utilities of the present general inventive concept are also achieved by providing an information processing apparatus, comprising a main body having a mounting slot to insertably mount a peripheral device to the information processing apparatus, a door rotatably coupled to the main body to rotate between an open position to expose the mounting slot and a closed position to cover the mounting slot, and an elastic member coupled to the main body and the door to press against a portion of the door as the door rotates and to bias the door to maintain at least one of the closed position and the open position.

The elastic member may bias the door to maintain the closed position.

The elastic member may bias the door to maintain the open position.

The elastic member may comprise a mounting part to couple the elastic member to the main body, and a keeping part having one or more elastic projections to press against the door as it rotates and to bias the door to maintain one of the closed position and the open position.

The apparatus may further comprise at least one hinge shaft coupled to one of the door and the main body to guide the rotation of the door, and at least one hinge shaft accommodation part couple to another one of the door and the main body to couple to the hinge shaft.

The elastic member may press against the hinge shaft as the portion of the door the elastic member presses.

The foregoing and/or other aspects and utilities of the present general inventive concept are also achieved by providing an information processing apparatus, comprising a main body having a mounting slot to insertably mount a peripheral device to the information processing apparatus, a door having curved hinge shafts to couple with the main body to cover and uncover the mounting slot, hinge accommodation parts disposed on the main body at sides of the mounting slot to couple with the curved hinge shafts and to guide a rotating movement of the door.

The apparatus may further comprise an elastic member coupled to the main body and the door to press against the curved hinge shafts as the door rotates and to bias the door to maintain a predetermined position.

The elastic member may comprise a mounting part to couple the elastic member to the main body, and a keeping part having one or more elastic projections to press against the curved hinge shafts as the door rotates and to bias the door to maintain the predetermined position.

The foregoing and/or other aspects and utilities of the present general inventive concept are also achieved by providing an information processing apparatus, comprising a main body including a mounting slot to insertably mount a peripheral device and a hinge mounting portion disposed at each side of the mounting slot to engage with respective door hinges, and a door including door hinges to engage with the respective hinge mounting portions to rotatably open and close access to the mounting slot.

The apparatus may further comprise an elastic member coupled to the main body and the door to press against the door hinge as the door rotates.

The door hinges may be curved such that a pressure applied by the elastic member to the curved door hinge biases the door to maintain at least one of a closed position and an open position.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
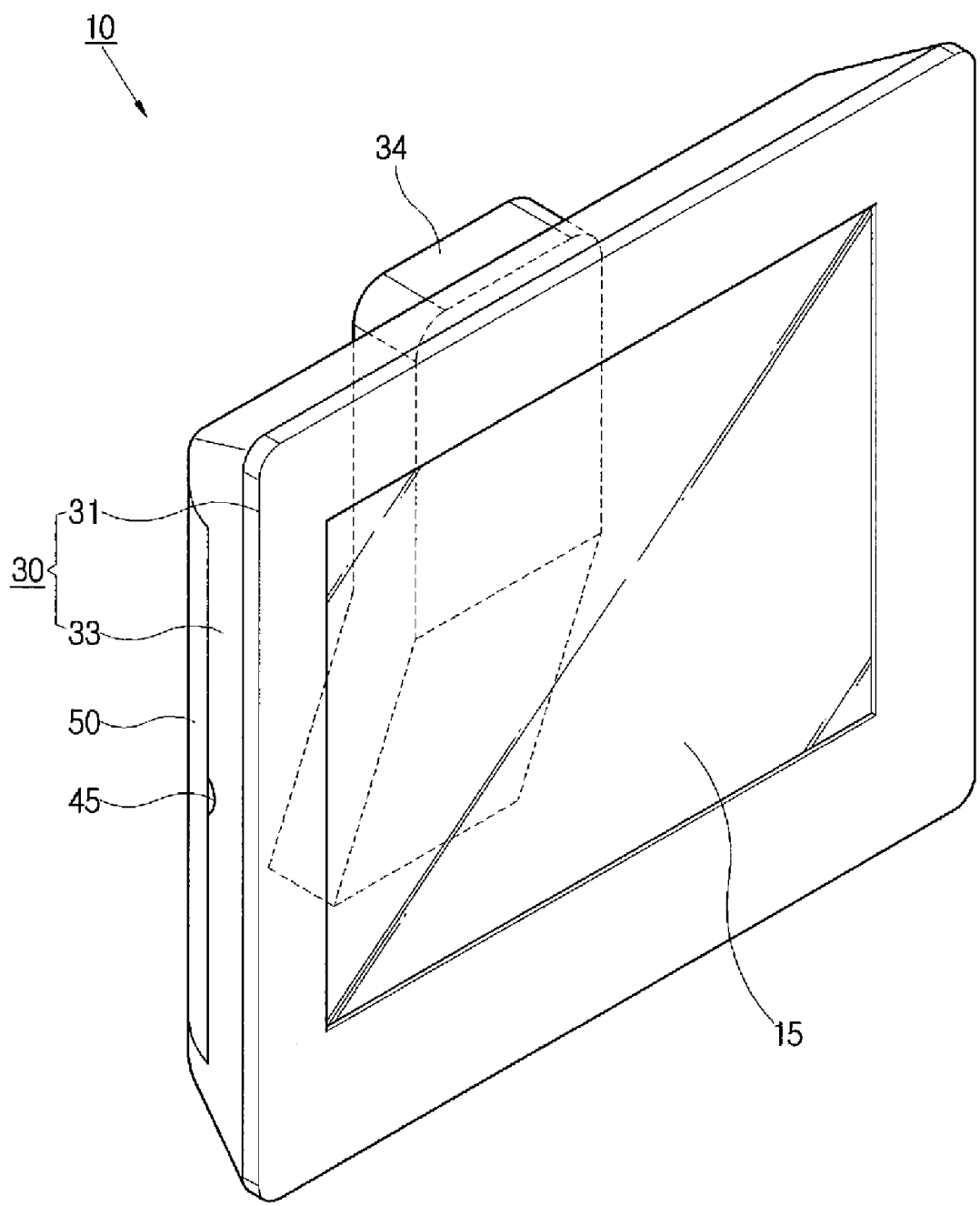
FIG. 1 is a perspective view illustrating an information processing apparatus according to the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
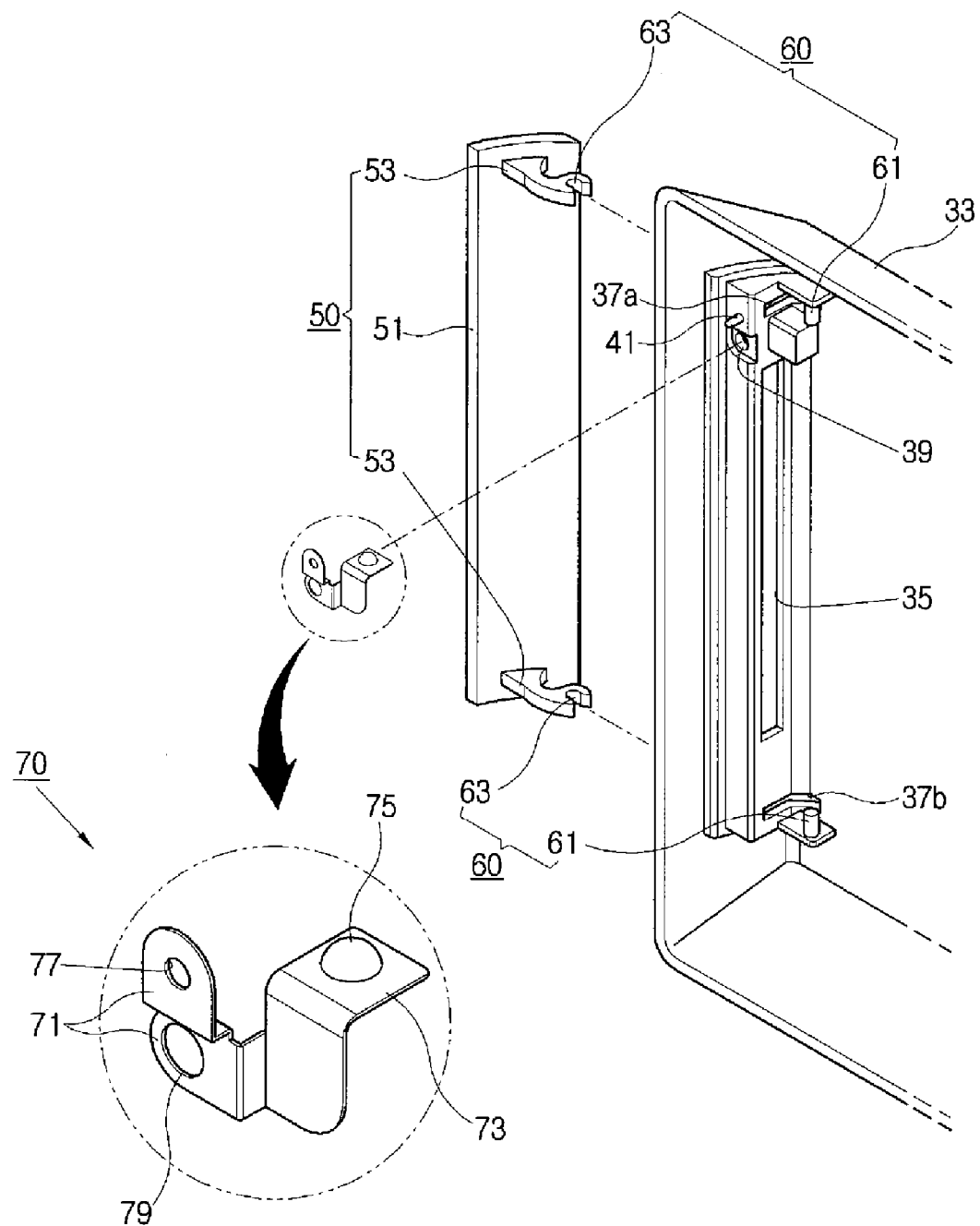
FIG. 2 is an exploded perspective view illustrating the information processing apparatus according to an embodiment of the present general inventive concept.

As illustrated in FIGS. 1 and 2, an information processing apparatus 10 may comprise a main body casing 30 which has a mounting slot 35 to which a peripheral device 20 (see FIG. 4B) can be detachably attached, a door 50 which is coupled with the main body casing 30 by a hinge to rotatably open and close the mounting slot 35, and an elastic member 70 which is coupled with the main body casing 30 to elastically press the door 50 when the door 50 rotatably opens and closes the mounting slot 35. The information processing apparatus 10 may further comprise hinge parts 60 which have hinge shafts 61 which are formed on the main body casing 30, and hinge shaft accommodating grooves 63 which are provided on the door 50 to be coupled with the hinge shafts 61.

The information processing apparatus 10 may comprise an MP3 player, a personal digital assistant (PDA), a cell phone, a digital photo frame, and a portable multimedia player (PMP), by way of example. The information processing apparatus may further comprise a display apparatus such as a monitor of a personal computer which displays a signal input from an external signal source, as well as a portable computer. For convenience of description, the digital photo frame will be described as an example of the information processing apparatus 10 according to the present general inventive concept.

The information processing apparatus 10, such as the digital photo frame, may comprise a display panel 15 which displays an image thereon; a front cover 31 which comprises an opening to accommodate the display panel 15; and a rear cover 33 which is coupled with the front cover 31. A circuit (not illustrated) like a printed circuit board (PCB) can be provided in the front cover 31. The rear cover 33 is coupled with the front cover 31 to protect the circuit. The information processing apparatus 10 further comprises a supporting bracket 34 which is installed on an installing surface such as a table to support the main body casing 30.

Figure 3:
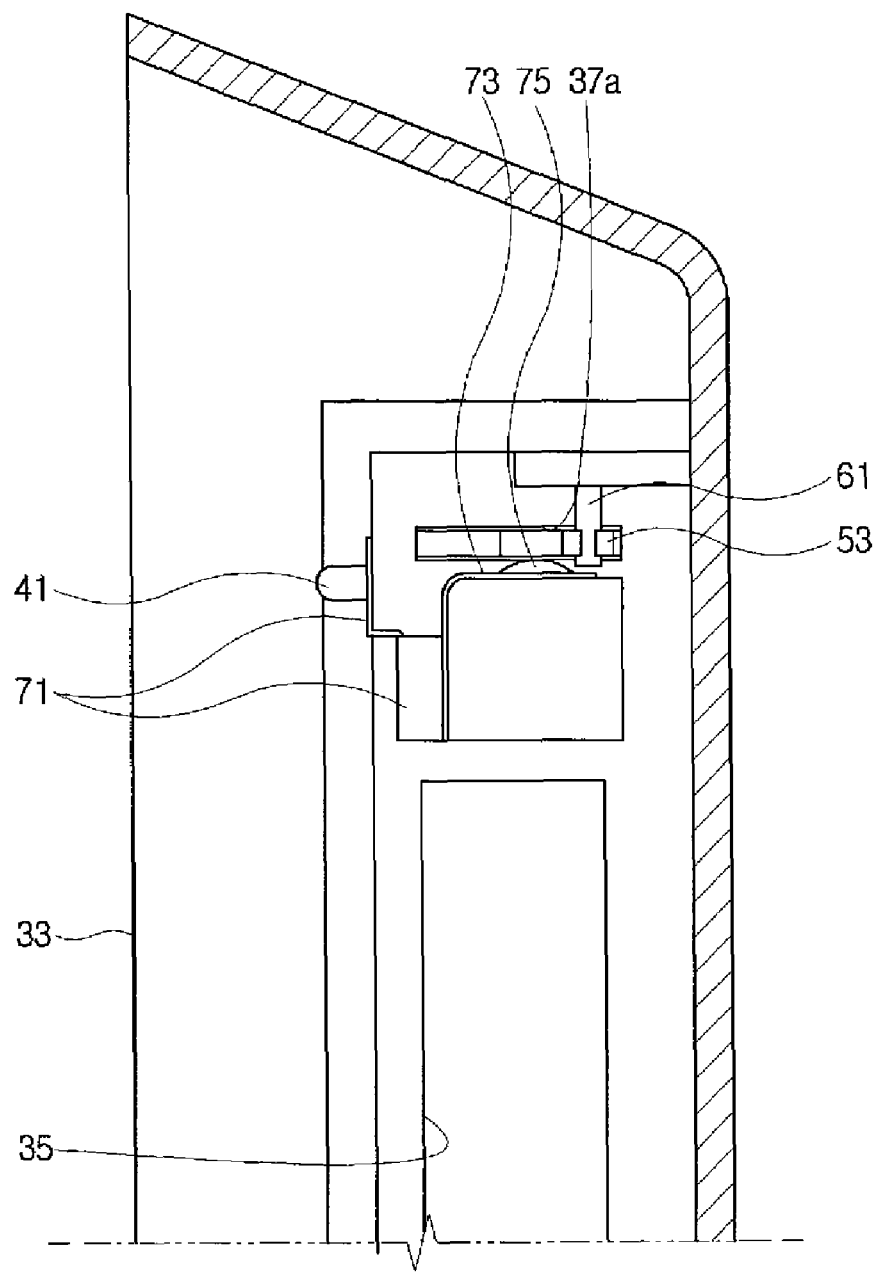
FIG. 3 is a sectional view illustrating an elastic member of the information processing apparatus of FIG. 2.
Figure 4A:
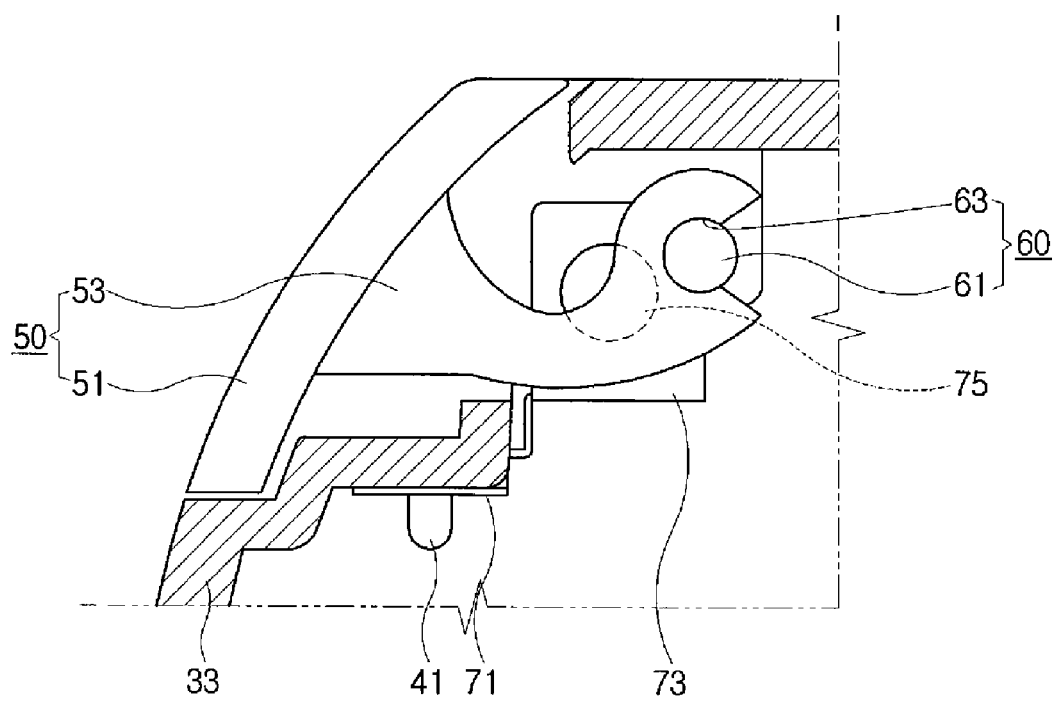
FIG. 4A is a sectional view illustrating a door of the information processing apparatus of FIG. 2, when it rotates.
Figure 4B:
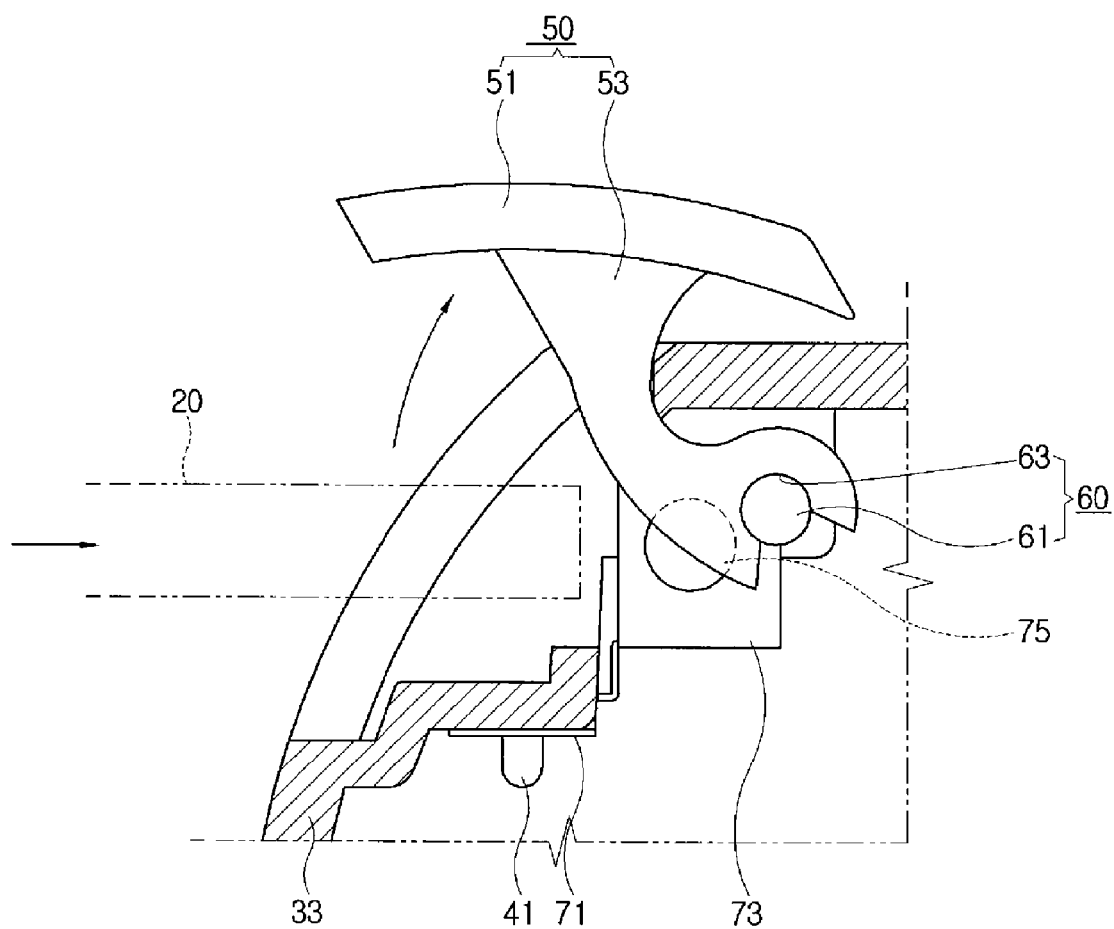
FIG. 4B is a sectional view illustrating the door of the information processing apparatus of FIG. 2.

As illustrated in FIGS. 3 and 4B, the peripheral device 20 is mounted in the mounting slot 35 (to be described later) to transmit/receive information or data. The peripheral device 20 may comprise a secure digital (SD) card, a compact flash (CF) card, a multi media card (MMC), a universal serial bus (USB) memory, and the like.

As illustrated in FIG. 1, the main body casing 30 forms an external appearance of the information processing apparatus 10 as the front cover 31 and the rear cover 33 are coupled with each other. The main body casing 30 comprises the mounting slot 35 to which the peripheral device 20 is detachably attached; and the door 50 which rotatably opens and closes the mounting slot 35.

As illustrated in FIGS. 2 through 4B, the peripheral device 20 to transmit/receive information or data is insertably mounted to the mounting slot 35. The door 50 is adjacent to the mounting slot 35 to prevent dirt from being introduced to the mounting slot 35.

As illustrated in FIG. 2, door slots 37*a* and 37*b* are formed on opposite end parts of the mounting slot 35 of the main body casing 30 to guide the door 50 to rotate between an opening position and a closing position. The length of the door slots 37*a* and 37*b* may change according to a rotation direction of the door 50 to adjust a rotation angle of the door 50.

An elastic member supporter 39 is formed on a plate surface of the main body casing 30 and coupled with a mounting part 71 (to be described later). The elastic member supporter 39 comprises a position determining pin 41 which is formed on a plate surface thereof. A through hole (not illustrated) is provided on the elastic member supporter 39 to be coupled with a coupling unit such as a screw so that the elastic member 70 is coupled with the front cover 31 and the rear cover 33.

The position determining pin 41 is formed on the plate surface of the elastic member supporter 39 and accommodated in a position determining pin hole 77 of the elastic member 70 to support the elastic member 70. Thus, the elastic member 70 may be stably supported during assembling, etc.

As illustrated in FIG. 1, a door grip 45 can be formed on the plate surface of the main body casing 30 so that a user can open the door 50 from a closed position. Thus, a user may open the door 50 without difficulty.

As illustrated in FIGS. 1 and 2, the door 50 is coupled with the main body casing 30 by a hinge to rotatably open and close the mounting slot 35. The door 50 may comprise a door main body 51 which has a shape corresponding to that of the mounting slot 35, and a pair of door arms 53 which are formed on a plate surface of the door main body 51 facing toward the inside of the main body casing 30 and extend from end parts of the door main body 51. The hinge shaft accommodating grooves 63 are formed on the end parts of the door arms 53 to be engaged with the hinge shafts 61.

As illustrated in FIG. 2, each of the hinge parts 60 comprises the hinge shaft 61 which is formed on the plate surface of the main body casing 30, and the hinge shaft accommodating groove 63 which is formed on the door arm 53 to be engaged with the hinge shaft 61.

While in the embodiment illustrated in FIG. 2 the hinge shafts 61 are formed on the plate surface of the main body casing 30 to extend toward the door arms 53, the present general inventive concept is not limited thereto, and the hinge shafts 61 may alternatively be formed on the door arms 53. Similarly, while the hinge shaft accommodating grooves 63 are illustrated in FIG. 2 as formed on the opposite end parts of the door arms 53, the present general inventive concept is not limited thereto, and the hinge shaft accommodating grooves 63 may alternatively be formed on the main body casing 30.

The hinge shafts 61 and the hinge shaft accommodating grooves 63 are coupled with each other to generate a predetermined friction force, and maintain an opening angle of the door 50 in a predetermined position.

Thus, the door 50 can rotate stably by the hinge parts 60 between the opening position and the closing position.

The elastic member 70 is coupled with the main body casing 30 to elastically press the door 50 while the door is rotating. The elastic member 70 comprises the mounting part 71 which is provided on a first side thereof and is coupled with the elastic member supporter 39, and a keeping part 73 comprising at least one elastic projection 75 which is provided on a second side of the elastic member 70 and inserted into the door slots 37*a* and/or 37*b* to elastically press the door 50. The elastic member 70 may be formed of a single plate with a simple configuration. While in the present embodiment there is provided one elastic member 70, the present general inventive concept is not limited thereto, and there may be provided two elastic members 70 to respectively press the pair of door arms 53 according to the size of the peripheral device 20 or of the information processing apparatus 10.

The mounting part 71 can be bent from the plate to be coupled with the elastic member supporter 39 and to support the elastic member 70. Thus, the elastic member 70 may be supported by the main body casing 30 more stably.

The keeping part 73 can be bent from the plate and comprises at least one elastic projection 75 which is formed on the plate surface to be inserted into the door slots 37*a* and/or 37*b* and to elastically press the door 50.

As illustrated in FIGS. 2 through 4B, the elastic projection 75 is formed on the plate surface of the keeping part 73 inserted into the door slots 37*a* and/or 37*b* to press the door arms 53 while the door 50 is rotating, to have a predetermined elastic force. Here, the size of the elastic projection 75 may be changed corresponding to the size of the door arms 53 to press the door arms 53 when the door is in the opening position. Thus, the door 50 may stably open and close the mounting slot 35 with a simple configuration. A projection accommodating groove (not illustrated) may be formed on the door arms 53 to be coupled with the elastic projection 75 so that the door 50 remains locked in the closing position, according to the size of the mounting slot 35 or of the door 50.

As illustrated in FIG. 2, the position determining pin hole 77 can be formed on the mounting part 71 of the elastic member 70 to be coupled with the position determining pin 41.

A coupling hole 79 can be formed on the mounting part 71 to couple the front cover 31 and the rear cover 33 through a coupler, such as a screw. Thus, the elastic member 70 may be supported to the main body casing 30 as the front cover 31 is coupled with the rear cover 33.

With the foregoing configuration, a process of assembling the information processing apparatus 10 and an opening and closing operation of the door 50 according to the present general inventive concept will be described with reference to FIGS. 2, 4A and 4B.

First, the assembling process of the information processing apparatus 10 will be described with reference to FIG. 2. The keeping part 73 of the elastic member 70 contacts an internal wall of the door slots 37*a* and/or 37*b*. When the mounting part 71 of the elastic member 70 is stably seated on the elastic member supporter 39 and the position determining pin 41 is inserted into the position determining pin hole 77, the elastic member 70 is coupled with the main body casing 30. Then, the door arms 53 are inserted into the door slots 37*a* and 37*b* to press the door main body 51, thereby coupling the hinge shafts 61 with the hinge shaft accommodating grooves 63. The mounting part 71 of the elastic member 70 is disposed between the front cover 31 and the rear cover 33 to couple them with each other. The main body casing 30 is coupled with the supporting bracket 34, thereby completing the assembling process.

Referring to FIGS. 4A and 4B which illustrate the door 50 in the closing and the opening position, respectively, the opening and closing process of the door 50 will be described. In the closing position, the elastic projection 75 of the keeping part 73 elastically presses the door arms 53 so that the door 50 closes the mounting slot 35. When a user contacts the door grip 45 and presses the door main body 51 to open the door 50 and to insert the peripheral device 20, such as an SD card, into the mounting slot 35, the door 50 rotates by the hinge 60 and opens. As the elastic projection 75 continuously presses the door arms 53, the door 50 is opened stably and securely. Also, the door 50 rotates smoothly and easily.

Figure 5:
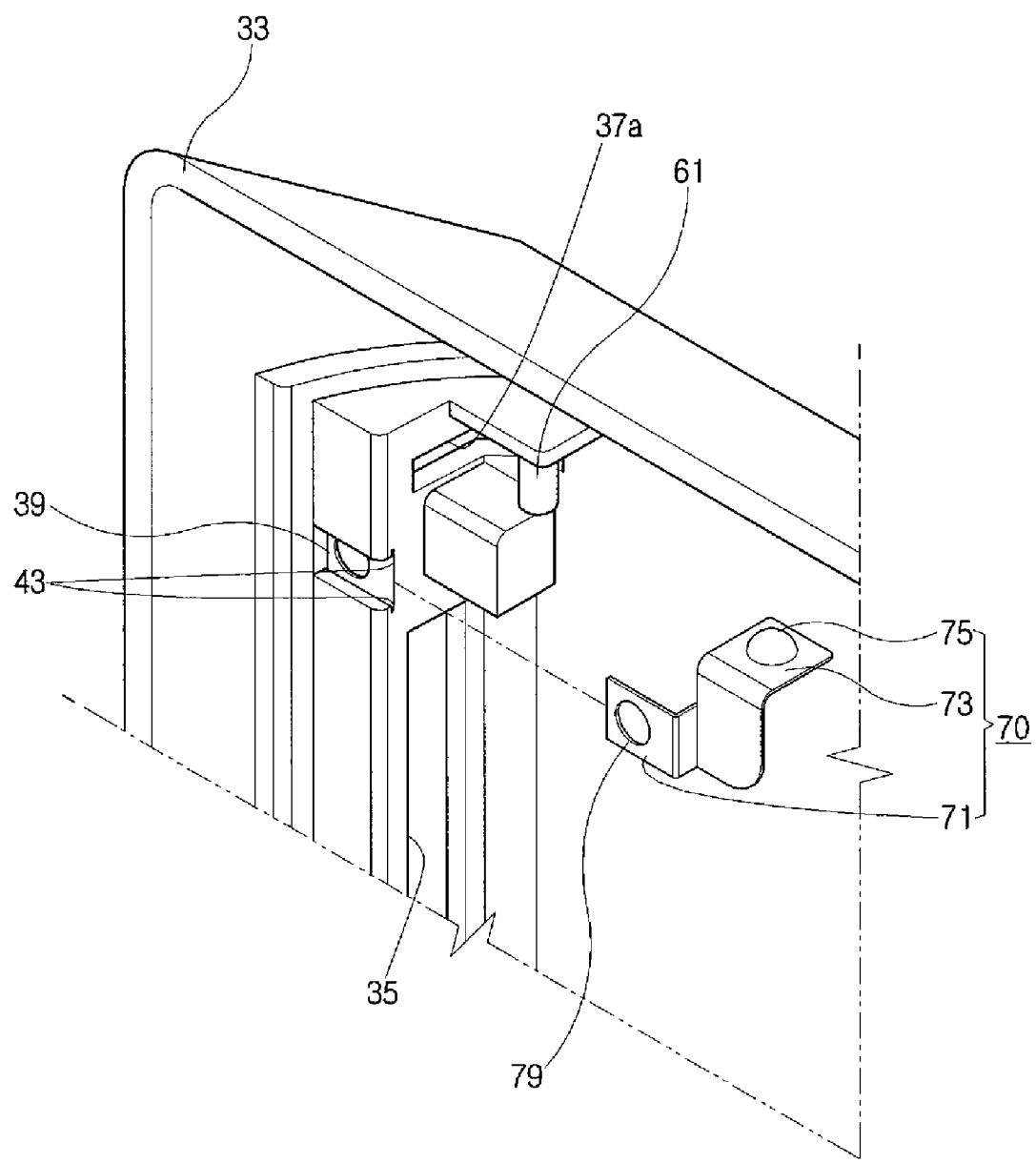
FIG. 5 is a partial perspective view illustrating an information processing apparatus according to another embodiment of the present general inventive concept.

As illustrated in FIG. 5, an information processing apparatus 10 according to another embodiment of the present general inventive concept may comprise a main body casing 30 (not illustrated) which has a mounting slot 35 to which a peripheral device 20 (not illustrated) is detachably attached, a door 50 (not illustrated) which is coupled with the main body casing 30 by a hinge to rotatably open and close the mounting slot 35, and an elastic member 70 which is coupled with the main body casing 30 to press the door 50 in a closing position and to make the door remain locked. An elastic member supporter 39 comprises sling grooves 43 which face each other to slidably guide an end part of the mounting part 71. Thus, the end part of the mounting part 71 is slidably guided by the sliding grooves 43 and supports the elastic member 70. The mounting part 71 according to the present embodiment of the present general inventive concept illustrated in FIG. 5 does not comprise a position determining pin hole 77, and the sliding grooves 43 are formed on the elastic supporter 39. Thus, in the present embodiment the elastic member 70 is inserted into the sliding grooves 43. As other elements and rotating process of the present embodiment are similar as those of the embodiment illustrated in FIGS. 2-4B, the detailed description of the present embodiment, illustrated in FIG. 5, will be omitted.

While the digital photo frame is provided as an example of the present general inventive concept, the present general inventive concept is not limited thereto, and the general inventive concept can also be applicable to a portable information processing apparatus, such as a PDA and a PMP. Similarly, the exemplary embodiment of the present general inventive concept may be applicable to a door configuration to mount a battery as well as a peripheral device such as an SD card.

According to the present general inventive concept, the door configuration which rotatably opens and closes the mounting slot becomes simplified. Also, the information processing apparatus is assembled without difficulty, thereby reducing assembling time and costs.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An information processing apparatus, comprising:
   a main body casing which has a mounting slot to insertably mount a peripheral device;
   a door which is rotatably coupled with the main body casing to open and close the mounting slot; and
   an elastic member which is coupled with the main body casing to elastically press the door throughout an entire rotation of the door, the elastic member comprising:
      a mounting part which is formed on a first side thereof, and
      a keeping part which is formed integrally with the mounting part and has at least one elastic projection provided on a second side thereof to press the door when rotating.

2. The apparatus according to claim 1, wherein the main body casing comprises:
   a plurality of door slots which are formed adjacent to the mounting slot to rotatably guide the door between a closing position and an opening position; and
   an elastic member supporter which is formed on a plate surface of the main body casing and couples with the elastic member to support the elastic member to remain coupled to the main body.

3. The apparatus according to claim 2, wherein the mounting part of the elastic member couples with the elastic member supporter, and the keeping part of the elastic member is inserted into the door slots to press the door when rotating.

4. The apparatus according to claim 3, wherein the elastic member supporter comprises a position determining pin which is formed on a plate surface thereof, and
   the mounting part comprises a position determining pin hole which couples with the position determining pin.

5. The apparatus according to claim 1, further comprising:
   a hinge part having a hinge shaft which is provided on one of the door and the main body casing; and
   a hinge shaft accommodating groove which is formed on the other one of the door and the main body casing and coupled with the hinge shaft.

6. The apparatus according to claim 5, wherein the elastic member presses on a portion of the hinge shaft as the door rotates.

7. The apparatus according to claim 1, wherein the main body casing comprises a door grip to press and open the door in the closing position.

8. The apparatus according to claim 3, wherein the elastic member supporter comprises sliding grooves which face each other, and slidably guide an end part of the mounting part.

9. The apparatus according to claim 3, wherein the elastic projection is formed on the keeping part to press the door in the opening position of the door.

10. An information processing apparatus, comprising:
    a main body having a mounting slot to insertably mount a peripheral device to the information processing apparatus;
    a door rotatably coupled to the main body to rotate between an open position to expose the mounting slot and a closed position to cover the mounting slot; and
    an elastic member coupled to the main body to press against a portion of the door throughout an entire rotation of the door and to bias the door to maintain at least one of the closed position and the open position, the elastic member comprising a mounting part to couple the elastic member to the main body, and a keeping part having one or more elastic projections to press against the door as it rotates and to bias the door to maintain one of the closed position and the open position, and the mounting part and the keeping part being formed integrally with each other.

11. The apparatus of claim 10, wherein the elastic member biases the door to maintain the closed position.

12. The apparatus of claim 10, wherein the elastic member biases the door to maintain the open position.

13. The apparatus of claim 10, further comprising:
    at least one hinge shaft coupled to one of the door and the main body to guide the rotation of the door; and
    at least one hinge shaft accommodation part couple to another one of the door and the main body to couple to the hinge shaft.

14. The apparatus of claim 13, wherein the elastic member presses against the hinge shaft as the portion of the door the elastic member presses.

15. An information processing apparatus, comprising:
    a main body having a mounting slot to insertably mount a peripheral device to the information processing apparatus;

a door having curved hinge shafts to couple with the main body to cover and uncover the mounting slot; and hinge accommodation parts disposed on the main body at sides of the mounting slot to couple with the curved hinge shafts and to guide a rotating movement of the door throughout an entire rotation of the door.

16. The apparatus of claim 15, further comprising:

an elastic member coupled to the main body and the door to press against the curved hinge shafts as the door rotates and to bias the door to maintain a predetermined position.

17. The apparatus of claim 16, wherein the elastic member comprises:

a mounting part to couple the elastic member to the main body; and a keeping part having one or more elastic projections to press against the curved hinge shaft as the door rotates and to bias the door to maintain the predetermined position.

18. An information processing apparatus, comprising:

a main body including a mounting slot to insertably mount a peripheral device and a hinge mounting portion disposed at each side of the mounting slot to engage with respective door hinges;

a door including door hinges to engage with the respective hinge mounting portions to rotatably open and close access to the mounting slot; and an elastic member coupled to the main body and the door to press against the door hinge throughout an entire rotation of the door, the elastic member comprising a mounting part which is formed on a first side thereof, and a keeping part which is formed integrally with the mounting part and has at least one elastic projection provided on a second side thereof to press the door when rotating.

19. The apparatus of claim 18, wherein the door hinges are curved such that a pressure applied by the elastic member to the curved door hinge biases the door to maintain at least one of a closed position and an open position.

20. An information processing apparatus, comprising:

a main body having a mounting slot to mount a peripheral device;

a door to cover the mounting slot, the door comprising a plurality of arms extending from the door to couple with the main body and to guide an opening and closing of the door; and an elastic member coupled to the main body having at least one elastic protrusion to press against at least one of the arms throughout an entire rotation of the door to maintain the door in at least one predetermined position.

21. The information processing apparatus of claim 20, wherein the main body comprising a plurality of hinge shafts to correspond to the plurality of arms, and the plurality of arms each comprises a hinge shaft accommodation part to couple with the hinge shaft and guide a movement of the door.

22. The information processing apparatus of claim 20, wherein the elastic member comprises:

a first portion to fixedly couple with the main body; and a second portion to flexibly support the at least one elastic protrusion.

23. The information processing apparatus of claim 20, wherein the elastic member comprises:

a first plate shape portion to fixedly couple with the main body; and a second plate shape portion to flexibly support the at least one elastic protrusion.

* * * * *